United States Patent Office 3,531,339
Patented Sept. 29, 1970

3,531,339
PROPELLANT COMPOSITIONS COMPRISING SOLID SOLUTION OF LITHIUM PERCHLORATE IN A POLYUREA BINDER
Lucius G. Gilman, Wakefield, and Robert I. Lait, Swampscott, Mass., assignors to Monsanto Research Corporation, St. Louis, Mo., a corporation of Delaware
No Drawing. Filed July 2, 1962, Ser. No. 207,470
Int. Cl. C06d 5/00
U.S. Cl. 149—83                                        11 Claims

ABSTRACT OF THE DISCLOSURE

This invention relates to lithium perchlorate, and more particularly, provides novel methods of producing polymeric solid solutions of lithium perchlorate and novel products comprising solid solutions of lithium perchlorate in a polyurea binder, wherein the polyurea polymeric binder and the lithium perchlorate are in the same homogeneous phase.

---

Conventional composite solid propellant compositions generally consist of an inorganic oxidant and a plastic binder, which also serves as a reductant-fuel of the system. The combination provides a heterogenous composition for which the burning rate and stability to detonation are at least partially dependent upon the particle size of the oxidant. The former property is improved as the particle size of the oxidant is reduced. However, milling to provide a finely divided oxidant is hazardous and periodic explosions are encountered.

It has been found that by dissolving the oxidant in the polymeric binder, the oxidant is provided in a state of subdivision finer than any grinding can produce, while avoiding the hazards of milling. Moreover, it produces an unexpected decrease in the impact sensitivity of the binder-oxidant combination.

Putting the oxidant into the same phase as the binder also raises the available solids loading of the composition. There is a limit to the solids loading for a given amount of polymeric binder, above which not enough binder will be available to form a continuous phase binding the discontinuous solids phase into a unitary structure. In the conventional composite propellant, the solids phase includes oxidant for the binder. To the extent that the binder phase includes its own oxidant, in the same homogeneous phase as the binder, available solids loading is freed for inclusion of other energetic components. Since oxidation of the polymeric binder usually contributes much less to the specific impulse of propellants than combustion of the energetic solids components, the reduction in ratio of binder to total composition achieved by replacing composite systems with solid solutions is advantageous.

Furthermore, the solid solution propellants are denser than composites, and therefore their impulse for a given volume is higher. This results in a desirable reduction in size of rockets of a given range, or alternatively, means that a larger range is covered by a rocket of a given size.

Where possible, it is advantageous to prepare the polymeric solid solutions of the stated kind by dissolving the perchlorate in a mix comprising a polymerizable monomer, and thereafter polymerizing the monomer to form the polymeric solid solution of the perchlorate. Not all polymerizing systems are useful for this purpose. Polymerization reactions evolving water as a by-product must be excluded, since it is found that water throws the perchlorate out of solution and that the hydrate of the perchlorate is not soluble in polymeric organic binders. Furthermore, it is only the amount of perchlorate which is in solution in the monomer system which is dissolved in the resulting polymer, usually, so that the solvent power of the monomer system for the perchlorate is a limiting factor.

One method which can be used to prepare polymeric solid solutions of lithium perchlorate from a monomeric system comprises polymerization of a glycol with a diisocyanate in the presence of dissolved lithium perchlorate. The reaction of a glycol with a diisocyanate forms a polyurethane polymer, without evolution of water. Lithium perchlorate is insoluble in organic diisocyanates. It is soluble in glycols, however, and this solubility is found to be essentially proportional to temperature. Thus by dissolving lithium perchlorate in the glycol at elevated temperatures, close to 200° C., enough perchlorate can be put into solution to supply the oxidation requirements of both the isocyanate and glycol components of the polymer resulting from their reaction. Polymerization with the diisocyanate can be conducted at temperatures of about 150° C.

A disadvantage of the stated procedure employing a glycol is that operating at such elevated temperatures with a perchlorate may be hazardous. When a polymeric solid solution of an oxidizer is employed as the binder in producing an ultimate propellant including other energetic components as a solids phase, particularly, the use of elevated temperatures may be highly objectionable.

It is known that diisocyanates also react with diamines to form polymers without evolution of water. The aliphatic shorter-chain diamines and diisocyanates are fluid at room temperature or at least relatively low temperatures, below about 100° C., and thus in a mix such as a combination of energetic solids and polymerizable monomers employed to produce a propellant composition, they can supply fluidity to the mix at high solids loadings. However, their reaction is violent, and the exotherm in a 15 to 20 gram sample of aliphatic reactants may be as much as forty to forty-five degrees C. On a larger scale, enough heat may be generated to cause ignition of sensitive components of the mixture.

In solubility experiments with the diamines, it was found that, when increments of lithium perchlorate were added to alkylene diamines with chain lengths ranging from ethylene diamine to hexamethylene diamine, and when the mixture was held at a temperature of 85° C., an insoluble phase existed even before a ratio as high as 1 mole of lithium perchlorate to 1 mole of the diamine had been introduced. It is desired that polymeric solid solution binders include a high enough dissolved perchlorate oxidizer content to satisfy their own oxidation requirements, and less than one mole per mole of one of two monomers will be inadequate.

It is an object of this invention to provide novel polymeric solid solutions of a metal salt.

A particular object of this invention is to provide novel polymeric solid solutions of lithium perchlorate with a polyurea bond as an integral part of the polymer chain, wherein said perchlorate and polymer are in the same homogeneous phase.

Another object is to provide novel polymeric solid solutions of lithium perchlorate wherein the polymer is characterized by polyurea bonds linking the polymer chain units, comprising an oxidant amount of lithium perchlorate in the same homogeneous phase as said polymer.

Still another object is to provide a novel advantageous method of preparing polymeric solid solutions of lithium perchlorate, wherein said perchlorate and polymer are in the same homogeneous phase, wherein the polymerization can be effected at temperatures substantially below about 200° C., and particularly, below about 100° C.

These and other objects will become evident from a consideration of the following specification and claims.

It has now been found that polymeric solid solutions of lithium perchlorate, wherein the polymer and the perchlorate are in the same homogeneous phase, can advantageously be prepared by polymerizing an active hydrogen difunctional compound, selected from the class consisting of diamines and amino alcohols, with a diisocyanate, in the presence of dissolved lithium perchlorate. The products are novel polymeric solid solutions of lithium perchlorate adapted for use as solid propellant binders, and possessing unique and advantageous properties, which are polymeric solid solutions of lithium perchlorate and polymer in the same homogeneous phase, wherein said polymer is characterized by the fact that at least about half the bonds linking repetitive units of the polymer chain are urea groups, and the remainder of said bonds are selected from the class consisting of urethane and urea groups.

As stated above, when increasing amounts of lithium perchlorate are added to an alkylene diamine at temperatures below 100° C., an insoluble phase appears as the amount of perchlorate approaches 50 mole percent of the total. It has now been found that the explanation of this appearance of a solid phase is the formation of a 1:1 molar ratio compound between the diamine and lithium perchlorate. These compounds, it has been established, are sharply individualized materials, which are apparently chelate coordination compounds of the alkylene diamine with the perchlorate. They are generally insoluble in organic solvents such as ethers and alcohols, and their melting points are high. The 1:1 coordination compound of trimethylene diamine melts at just above 100° C., and the tetramethylene diamine/lithium perchlorate 1:1 molar ratio coordination compound melts at close to 200° C., while the corresponding compound with hexamethylene diamine melts at even a higher temperature.

While these temperatures are prohibitive for the present purposes, it has now further been found that the stated coordination compounds form eutectics with lithium perchlorate. These eutectics melt at considerably lower temperatures than either the coordination compound or the perchlorate, including temperatures below about 100° C.

Accordingly, by combining more than a molar equivalent of lithium perchlorate with an alkylene diamine, melts are provided which, in effect, are equivalent to solutions of lithium perchlorate in the diamine in which the ratio of the lithium perchlorate to the diamine is substantially above about one mole of perchlorate per mole of the diamine, and containing sufficient dissolved lithium perchlorate to make such solutions useful for the preparation of polymeric solid solution propellant binders, by polymerization of the diamine with a diisocyanate.

Moreover, it has unexpectedly been found that the presence of the lithium perchlorate in the diamine reduces the basicity of diamine, probably due to the coordination of the amine groups with the metal salt, and thereby greatly moderates the rate of reaction. Thus the presence of the dissolved perchlorate obviates the problem of the excessive exotherm associated with the reaction of a diamine with a diisocyanate.

Still another advantage that has been found to exist is that the properties of the resulting polyurea are better than those of the polyurea prepared in the absence of dissolved perchlorate, for propellant binder purposes. The polymer is plasticized by the metal perchlorate, and is less brittle and more rubbery. The presence of the perchlorate also affects the optical properties of the polymer. Where the polyurea prepared from the diamine and a diisocyanate in the absence of dissolved lithium perchlorate is a crystalline opaque material, that including the dissolved lithium perchlorate is a clear, translucent to transparent material.

Of the perchlorate oxidizers usually employed for propellant purposes, only lithium perchlorate is useful in the stated method. Mixing ammonium perchlorate with a diamine at temperatures below about 100° C. produces evolution of ammonia, and instead of a solution of the perchlorate, what is obtained is the perchloric acid salt of the amine. The solvating power of amine nitrogen for sodium and potassium is negligible, and these alkali metal perchlorates will not form complex coordination compounds or eutectics of the above-discussed nature.

While the perchlorate is thus not subject to variation, it has been found in accordance with the present invention that in addition to the above-described method, which produces a polyurea solid solution, polymeric solid solutions of a perchlorate oxidizer can also be prepared advantageously by polymerizing an amino alcohol with a diisocyanate in the presence of dissolved lithium perchlorate.

Oxygen can act as a donor atom in the formation of coordination compounds as well as nitrogen. Indeed oxygen is the donor atom in the great majority of known stable coordination compounds of the light metals, including the alkali metals with an atomic weight of below 40. However, it is found that the phase diagram of the amino alcohol systems with lithium perchlorate is essentially different from that of the diamine systems, and no clearly defined indication of coordination compound formation is observed. In general, the amino alcohol/lithium perchlorate systems resemble the systems with glycols.

The solvent power of the amino alcohols, nevertheless, in significantly greater than that of corresponding glycols at temperatures below 100° C. For example, ethylene glycol dissolves up to 3 times its own weight of lithium perchlorate at 85° C., but 2-aminoethanol dissolves 6.5 times its own weight of this perchlorate at the same temperature. Similarly, the amount of lithium perchlorate soluble in 3-aminopropanol at below 100° C. is appreciably greater than the amount soluble in 1,3-propanediol, and so forth. Additionally, the amino alcohols have the advantage that their reactivity with diisocyanates is approximately intermediate between that of the diamines and that of the glycols.

Accordingly, the amino alcohols provide a class of difunctional compound which has unexpected and significant advantages over both the diamines and the glycols as a reactant in preparation of polymeric solid lithium perchlorate solutions. Since the substitution of one amine function by a hydroxyl function is found to interfere with high-melting coordination complex formation, any of a wide range of perchlorate ratios can be used without danger of unexpected formation of a solid phase at particular monomer-perchlorate ratios. Compared to the glycols, on the other hand, the amino alcohols have the advantages of lower temperatures for dissolving the same amount of the perchlorate and also for effecting polymerization with diisocyanates.

In the products of the stated method, the polymeric component is characterized by a structure in which at least about half the bonds linking repetitive units are urea groups and the remainder are urethane groups. The polymeric solid solutions of lithium perchlorate in a polyurea/polyurethane polymer provided by the present invention are translucent to transparent materials which are generally rubber-like in physical properties, and which have desirable properties for use as propellant binders.

Referring now in more detail to a description of the products of this invention which may be prepared by the stated method of polymerizing in the presence of dissolved lithium perchlorate, they comprise polymeric solid solutions of an oxidant amount of lithium perchlorate and polymer, of the above stated nature, in the same homogeneous phase.

By solid solution is meant that the perchlorate and the polymer are homogeneously mixed and in the same phase, to the extent that heterogeneity therebetween is not evident on examination under an ocular microscope.

By a polymeric binder is meant a matrix comprising polymer having a molecular weight at least sufficient to make the polymer solid at room temperature. It is undesirable to have the molecular weight so high that the polymer is infusible and insoluble. Preferably, the product will be sufficiently elastomeric to have a tensile strength of at least 50 pounds per square inch (p.s.i.) and ultimate elongation (at break) of at least 20%.

The perchlorate must be anhydrous, containing less than about 0.5 mole-percent water, and in references to it, it is to be understood that anhydrous perchlorate is meant.

By an oxident amount of the perchlorate is meant enough to supply the combustion oxidation requirements of a significant portion, which will be at least about half the oxidation requirements of the polymer. Lithium perchlorate, $LiClO_4$, decomposes to LiCl and 2 moles of oxygen molecules per mole of perchlorate. Thus referring for example to oxidation of polymers including $CH_2$ and like hydrocarbon units, if the C atom forms CO and hydrogen atoms form water, respectively, as gaseous oxidation products, the consumption of oxidant is 0.5 mole of lithium perchlorate per mole of methylene units so oxidized. Under certain conditions, the hydrogen is not oxidized, or oxidized only in part, but then a corresponding amount of metal is oxidized, and the oxygen consumption is not lowered. Thus the ratio of perchlorate to polymer to supply the oxidation requirements will be at least about 0.5 mole per mole of reduced carbon atoms in the polymer. To attain the benefits of this invention, at least half of this consumption requirement is supplied by dissolved lithium perchlorate in the same homogeneous phase as the polymer.

Preferably, all the oxygen requirement for oxidation of the polymer is supplied by dissolved lithium perchlorate, and still more preferably, more than half and desirably all the oxygen requirement of the total composition is supplied by such perchlorate.

The present compositions may consist essentially or entirely of the polymer and lithium perchlorate. Such compositions are monopropellants which can be employed as such to produce propellant gases for rockets and the like by burning, and explosive forces on ignition in an enclosed space.

As will appear hereinafter, it may be desirable to include other components in the composition. These may either be part of the same binder phase as the polymer, or part of the discontinuous solids phase combined with the binder. They may include fuels and oxidants, as further pointed out hereinafter. If these other components are fuels, they consume oxygen, and thus increase the total oxygen requirements of the composition. Where additional oxidant is included, the lithium perchlorate need not supply all the oxidant requirements of the composition, but to adapt the composition for propellant and fuel use, it is necessary that the composition include sufficient total oxidant to render combustion of the system self-supporting.

The nature of the polymers in the novel products of this invention will be best appreciated from a consideration of the method of the invention, as discussed below. In general, they may be described as polymers in which the repeating units are linked by complex amidic groups as bonds therebetween. At least about half of the said groups will be urea groups, and the remainder will be selected from the class consisting of urea and urethane groups. The repeating units so linked will be carbon atom chains which in many cases will be hydrocarbon chains, such as alkylene and arylene units, but are not limited thereto: they may be substituted by noninterfering substituents, or interrupted by hetero atoms such as at O, S or the like.

In practicing the method of this invention, an oxidant amount of lithium perchlorate will be dissolved in a reaction mixture comprising the active hydrogen polyfunctional monomer and this diamine or amino alcohol will be mixed with the diisocyanate to form a polymer, in the presence of the dissolved lithium perchlorate.

Presently useful polyamines are preferably aliphatic diamines such as ethylenediamine, trimethylenediamine, tetramethylenediamine, hexamethylenediamine, pentamethylenediamine, octamethylenediamine, decamethylenediamine, 3-methylhexamethylenediamine and the like. The phase diagram of a mixture of lithium perchlorate with a dialkylenetriamine is like that of an alkylene diamine in showing a relatively wide temperature range over which mixtures including more than one mole of the perchlorate per mole of the amine are completely fluid, at usefully low temperatures, and thus these amines are also useful in the present process. Exemplary of such amines are 2,2'-iminobis(ethylamine), 3,3'-iminobis(n-propylamine), 3-[(2-aminoethyl)amino]propylamine and like. A primary amine group is apt to be particularly active and it is sometimes desirable to employ amines having nitrogen substituents to moderate the vigor of the polymerization reaction. Thus for example, a secondary amine such as N-methylethylenediamine, N-methyltrimethylene diamine, N-butylethylenediamine, N,N'-dimethylhexamethylene diamine and the like may be employed as reactants. Aromatic, cycloaliphatic and like polyamines are also useful in the practice of this invention. For example, illustrative polyamines which may be employed in the present method include p-tolylene diamine, m-phenylenediamine, cyclohexylene diamine and the like.

Other examples of presently useful polyamines are those incliuding hetero atoms in the polymer chain such as 2,2'-diamino diethyl ether and sulfide, the bis(glycine) ester of ethylene glycol, and so forth.

Generally diamines in which each nitrogen atom has active hydrogen as a substituent will tend to produce cross-linking, and thus compounds such as diethylene triamine, and dipropylene triamine will be employed in minor amounts, in conjunction with diamines, in the practice of this invention.

The term polyamine is used herein as broadly inclusive of any of a variety of compounds containing two $NH_2$ groups. For example, these include hydrazine. The $NH_2$ group may be adjacent to a carbonyl group and such polyamines (formally, amides) may be employed as reactants in practicing the method of this invention. For example, lithium perchlorate exhibits substantial solubility in urea, thiourea, o-tolyl biguanide and the like. Other such polyamines which may be employed in practicing this invention include 1,3-bis(2-aminoethyl)urea, carbodihydrazide, and so forth.

Still another class of active hydrogen polyfunctional monomers which can be used in practicing the method of this invention comprises the amino alcohols. By amino alcohols are meant alcohols containing reactive amine groups substituted by at least one hydrogen atom, preferably primary amino, and a hydroxyl function. Polyols containing tertiary nitrogen and even hindered secondary nitrogen will generally react essentially as hydroxy compounds, and thus nitrogen-containing polyols such as N-oleyl diethanolamine, N-mono(hydroxy ethyl)-N,N',N'-tris(hydroxypropyl)ethylenediamine, 1-(2-hydroxypropyl) - 3-(2-hydroxyethyl)urea, 1,3 - bis(2-hydroxyethyl) urea and the like are regarded for the present purposes as polyhydric alcohols.

Compounds classed as amino alcohols for the present purposes and useful in the practice of this invention are illustrated by ethanolamine, 3-aminopropanol, 3-aminobutanol, 4-aminobutanol, 2-hydroxy-2'-amino diethyl ether, the corresponding sulfide, and the like.

It is sometimes advantageous to reduce the activity of presently useful amines by quaternizing the nitrogen atom with an acid. References to amines as made herein are intended to include the corresponding acid salts. Preferably the acid employed for quaternization is one which will contribute to the energy content of the formulation, such as perchloric acid.

Proceeding now to a consideration of the second polyfunctional monomer, employed in the method of this invention to polymerize the active hydrogen polyfunctional monomer in the presence of dissolved lithium perchlorate, this will be a diisocyanate. Illustrative examples of suitable polyisocyanates are tetramethylene diisocyanate, pentamethylene diisocyanate, hexamethylenediisocyanate, octamethylene diisocyanate, dodecamethylene diisocyanate, m-phenylene diisocyanate, tolylene-2,4-diisocyanate, tolylene-2,6-diisocyanate, 3,3'-bitolylene - 4,4'-diisocyanate, naphthalene-1,5-diisocyanate, diphenylmethane-4,4'-diisocyanate, and the like. It is preferable that the polyisocyanate contain less than about 20 carbon atoms.

An equivalent of the polyisocyanate, preferably used when the exotherm of the polymerization reaction with the isocyanate is unduly great, is a urethane made by reacting a polyisocyanate with a low molecular weight alcohol such as ethanol. The displacement of the alcohol group during polymerization releases the alcohol as a byproduct; this can be drawn off if desired (as by putting the reaction mixture under vacuum) or left in the polymer to serve as a plasticizer for the product. Illustrative of the urethanes which may be used for this purpose are those made by reacting an isocyanate such as those listed above with a low molecular weight alcohol such as ethanol, methanol, isopropanol and the like.

The polymerization method of the present invention will comprise contacting the diamine or amino alcohol monomer with the diisocyanate in the presence of an oxidant amount of dissolved lithium perchlorate.

The lithium perchlorate will generally be dissolved in the amino-substituted monomer. The amount which is an oxidant amount of lithium perchlorate is calculated by reference to the total of the amino-substituted monomer and the diisocyanate. Generally it will desirably be the maximum soluble in the amine-substituted monomer at operating temperatures. As pointed out above, by exceeding a ratio of one mole of the perchlorate per mole of diamine, melts can be obtained which are eutectics of the diamine/lithium perchlorate 1:1 molar ratio coordination complexes, and these are in effect equivalent to solutions of high concentrations of lithium perchlorate in the diamine. Thus with the aliphatic diamines, amounts of from above 50 to about 70 or 80 mol-percent lithium perchlorate, referred to the total of perchlorate and diamine (providing up to 4 to 6 moles lithium perchlorate to 1 mole coordination complex) are favorable. With the amino alcohols, generally the rate of increase in solvent power for lithium perchlorate with a rise in temperature is disadvantageously small when the molar ratio of lithium perchlorate to amino alcohol exceeds about 3:2, but the particular amino alcohol and operating temperature selected will determine the solubility for any particular system.

Usually the amounts of the respective monomers will be proportioned to one another to supply one equivalent of the amino-substituted monomer to about one equivalent of the diisocyanate.

By an equivalent is meant a mole divided by the number of functional groups in the monomer. Thus one mole of the amino monomer will be employed per mole of the diisocyanate where each are difunctional; where the amino-monomer is tetrafunctional, one half mole of this will supply an equivalent per mole of a difunctional isocyanate monomer, and so forth. Sometimes a slight excess of one or the other will advantageously be employed, to facilitatte completion of the reaction.

Thus for example, the polymerization of a diamine and a diisocyanate is effected by preferably employing a slight molar excess of the diisocyanate sufficient to react with all of the amine groups, such as about 1.05 mole equivalents of diisocyanate per mole of diamine.

In general, poluymerization may be effected at temperatures ranging from 0° C. and below up to any temperature below the decomposition temperatures of reaction mixture components. The polymerization of presently employed reactants to provide the condensation polymers can be accelerated by the application of heat, but in general the system should not be held at temperatures in excess of about 200° C. to preclude the dissociation of the polymer and the possible hazard of effecting an explosive oxidation of the system. Normally polymerization temperatures below about 100° C., such as about 85° C., will be sufficient for most reactants selected.

Usually polymerization is effected simply by maintaining the monomers, in the presence of dissolved lithium perchlorate, in contact with one another at suitable temperatures. If desired variation of pressure from atmospheric—for example, down to 0.1 mm. Hg or up to 5000 p.s.i.—may be employed. Solvents and diluents, such as plasticizers and the like, discussed in more detail below, may be present. It is sometimes advantageous to employ a catalyst in connection with the practice of the present invention, to promote condensation of the monomers. Thus for example, useful catalysts include ferric acetyl acetonate and similar coordination compounds of transition metals, a base catalyst, such as a tertiary amine such as triethylamine, N,N-diethylcyclohexylamine, N-methylmorpholine, pyridine, 1,4 - diazabicyclo - [2.2.2] octane and so forth.

To provide a dense, substantially homogeneous polymer composition it is necessary to preclude the presence of agents in the polymerization system which would cause foam formation therein. Accordingly, where an isocyanate is employed as a reactant, the system should be maintained free from water. Also proper mixing means should be employed to preclude trapping air in the final polymer composition.

After polymerization is complete, it is sometimes advantageous to maintain the polymerized mass at temperatures above ambient temperature for a time, to effect cure or post-cure of the mass.

As the foregoing has indicated, compositions provided in accordance with this invention may consist essentially of a polymer of the kind stated above, and lithium perchlorate in solid solution therein. Such compositions are useful as fuels and monopropellants: they will burn to form energetic gases or, if confined, burn explosively.

Desirably, however, additional components will be present in compositions embodying the present invention. For example, the compositions may comprise polymer-modifying additives such as plasticizers. Internal plasticization is possible with a reactive functional monomer plasticizer, by inclusion in the polymer chain, as by employing a mixture of a major amount, such as 90 mol-percent, of a diamine and a lesser amount, such as 10 mol-percent, of a second polyfunctional monomer such as ethylene glycol. Plasticizing action may also be produced by employing as plasticizer fairly polar solvents such as a completely substituted amine type compound like dimethylformamide or a hydroxy compound which is hindered and thus unreactive such as a substituted cyclohexanol.

Thus, useful plasticizers are illustrated by amides, including sulfonamides such as N-ethyl-p-toluenesulfonamide, N-ethyl-o-toluenesulfonamide, and mixtures thereof, amides and hydrizides such as formamide, dimethylformamide, hydrazodicarbonamide and oxaldihydrazide, and so forth; glycol ethers such as triethyleneglycol dimethyl ether, ethylene glycol dimethyl ether and the like; ethylene glycol; plasticizers having good fuel properties and characterized by the presence of nitro groups, such as 5,5 - dinitro - 1,2 - hexanediol, bis(2,2 - dinitropropyl) formal, 5,5-dinitro-1,3-dioxane, tris(hydroxymethyl)nitro methane, and the like.

The presence of the plasticizers may render the composition more rubbery and provide a material improvement in tensil elongation of the material. The plasticizer employed will function as a fuel element in the composite solid propellant, and the ratio of lithium perchlorate should be adjusted so that a proper balance is maintained between the oxidant and the fuel combinations to provide complete combustion. The amount of plasticizer employed can vary up to about 35 weight percent of the polymer present in the composition but amounts of from about 15 to about 25 weight percent are generally preferred.

Also, the novel homogeneous, single-phase combinations of lithium perchlorate with polymers provided by this invention can advantageously contain metal and hydrate fuels. Thus for example, the propellant compositions may contain finely divided light metals and various hydrides thereof. Examples of these are beryllium, boron, magnesium, aluminum, magnesium hydride, aluminum hydride, the various solid hydrides such as decaborane and alkylated decaboranes (ethyl alkylated decarborane), aluminum borohydride, lithium aluminum hydride, and the like. For example, the homogeneous mixture of lithium perchlorate and the polymer may contain up to about 20% by weight of the total composition of atomized aluminum (particle size about 20 microns). Preferably the aforesaid fuel material should be sufficiently fine to all pass a standard 100 mesh screen, and more preferably should pass a 200 mesh screen.

These light metal and hydride high energy additives should preferably not exceed about 25 weight percent of the total composition, since the heavy combustion exhaust tends to lower performance of the solid propellant composition. It is often desirable to incorporate not more than from 5 to about 10 weight percent of said additives based on the total weight of the propellant composition.

Another group of additives which may be included in the system as part of the solids phase comprises oxidants, and other readily decomposable materials such as explosives. Illustrative of useful oxidants are, for example, ammonium perchlorate, ammonium nitrate and the like. Illustrative of useful explosive components are, for example, sodium azide.

The amount of oxidant employed in the solids phase will be adjusted in accordance with the amount of fuel to be burned in the composition and the amount of dissolved oxidant already supplied by the binder. Energetic, gas-supplying decomposable materials not requiring oxidant will usually be employed in gas-deficient systems, and the amount thereof adjusted to supply gas volume sufficient to take up thermal energy available so as to maximize the specific impulse of the system.

Referring to use of the presently provided compositions, when these are polymerization cast directly in a rocket motor, they will generally exhibit adhesive properties, and thereby adhere in polymerization to the cylinder in which they are cast. Due to this adhesive quality, it may be desirable for a core insert to be employed to provide the desired internal cavity to effect proper radial burning of the propellant composition. This may be fabricated from or coated with a material such as polyethylene or polytetrafluoroethylene in order to provide ready release of the insert when polymerization is terminated.

The solid propellant may also be produced by extrusion for insertion in small bore rocket cases. In this case, a small amount of catalyzed liquid polymer composition can first be added to the cylinder case such that the insertion of the extruded mass will displace the liquid polymer, forcing it to rise in the annular space between the extrusion mass and the cylinder wall, whereby the inserted mass is securely bonded within the case. This liquid polymer can be of similar composition to the propellant composition insert, or any other suitable polymer composition which can be readily cured at suitable temperatures, below about 200° C., such as, for example, epoxy resins, polysulfide rubbers and the like.

The lithium perchlorate polymeric compositions of this invention burn vigorously and relatively uniformly when ignited and are useful as a solid propellant for rockets including short range ballistic weapons such as aircraft and artillery rockets and long range strategic missiles, wherein they may be the sole propellant or be employed in one or more stage of a multi-stage rocket system. The aforesaid compositions are also useful for rocket assisted takeoff, as boosters, sustainers and as pyrotechnics. When confined the aforesaid compositions also are particularly valuable as explosives.

The invention is illustrated but not limited by the following examples in which all parts are by weight unless otherwise noted.

EXAMPLE 1

This example illustrates the formation of high melting lithium perchlorate coordination compounds with diamines and lower-melting eutectics thereof with lithium perchlorate.

Mixtures of lithium perchlorate and aliphatic diamines are fused, cooled and then the melting temperatures are recorded. The results, in terms of the approximate temperature below which solid phase is present in the mixture for various molar ratios of lithium perchlorate to diamine, are as follows:

|  | 70:30 | 65:35 | 60:40 | 50:50 | 40:60 | 30:70 | 25:75 | 20:80 |
|---|---|---|---|---|---|---|---|---|
| $(CH_2)_3(NH_2)_2$ |  | 70° | 70° | 100° | 70° | 65° |  |  |
| $NH[(CH_2)_3NH_2]_2$ | 95° | 85° | 90° | 145° | 115° |  |  |  |
| $(CH_2)_4(NH_2)_2$ | 110° |  | 130° | >190° | 165° |  | 150° | 140° |

EXAMPLE 2

This example illustrates formation of a polyurea solid solution. A mixture of 8 parts by weight of lithium perchloraate (0.075 mole) and 3 parts by weight of ethylene diamine (0.050 mole) is heated to 100° C. to form a fluid melt. Addition of one part by weight of tolylene-2, 4-diisocyanate at a temperature of about 50° C. effects reaction to provide a hard homogeneous polyurea including lithium perchlorate in solid solution therein in amount sufficient to sustain combustion.

At 85° C., ethylene diamine dissolves about four parts of lithium perchlorate per part of diamine.

EXAMPLE 3

This example illustrates formation of a polyurea using mixed diamines.

A melt with no solid phase present is prepared by heating 10 parts of $LiClO_4$ (0.10 mole) with a mixture of 1 part trimethylene diamine (0.0135 mole) and 1 part hexamethylene diamine (0.009 mole) at 85° C. To the clear solution at 60° C. is added 0.1 part ferric acetylacetonate and 3.7 parts hexamethylene diisocyanate. The mixture is stirred till homogeneity is obtained. The mixture polymerizes to a hard clear mass in 15–20 minutes at room temperature.

EXAMPLE 4

This example illustrates formation of a polymeric solid solution with a different type of diamine.

Fifteen drops of aminoethylpiperazine at 130° completely dissolve 10 grams of lithium perchlorate. The solution is cooled to 90° C. and about 20 drops of toluene diisocyanate are added. Polymerization to a hard mass is complete in a few seconds.

EXAMPLE 5

This example illustrates preparation of a polyurea solid solution with a diamine salt.

A mixture of 6 parts of lithium perchlorate and 1 part of trimethylene diamine monoperchlorate is completely fused by heating the mixture to 85° C. The temperature is lowered to 70° C. and 1 part of hexamethylene diisocyanate mixed with 0.1 part of triethylamine is added. The resulting reaction mixture is completely cured in 2–3 hours at 80° C. to provide a hard, translucent polymeric solid solution of the perchlorate.

EXAMPLE 6

This example illustrates preparation of a polyurea solid solution using a modified isocyanate reactant.

A clear melt is provided by heating 5 parts of lithium perchlorate with 1 part of trimethylene diamine to 85° C. This is mixed with 3.5 parts of the diethyl urethane of hexamethylene diisocyanate, and the mixture is then held at 120° C. while ethanol is driven off. The product is a trimethylene hexamethylene polyurea solid solution of lithium perchlorate.

EXAMPLE 7

This example illustrates preparation of a polymeric solid solution of lithium perchlorate wherein the polymer has both urea and urethane bonds.

A clear melt is provided by heating 100 parts of lithium perchlorate with 100 parts of isopropanolamine perchlorate at 85° C., to which 96 parts of hexamethylene diisocyanate are added. The mass is maintained at 85° C. for 6 hours, to provide a clear solid product.

While the invention has been described with particular reference to specific individual preferred embodiments thereof, it will be appreciated that modifications and variations can be made without departing from the scope of the invention, which is limited only as defined in the appended claims.

What is claimed is:

1. The method of forming a polymeric solid solution of lithium perchlorate wherein lithium perchlorate and the polymer are in the same homogeneous phase which comprises polymerizing an active hydrogen difunctional amino monomer, selected from the class consisting of diamines and amino alcohols, with a diisocyanate, in the presence of an oxidant amount of dissolved lithium perchlorate.

2. The method of claim 1, in which the lithium perchlorate is dissolved in said amino monomer.

3. The method of forming a polymeric solid solution of lithium perchlorate and a polymer in the same homogeneous phase which comprises dissolving an oxidant amount of lithium perchlorate in a diamine and polymerizing the said diamine with a diisocyanate.

4. The method of claim 3 wherein said lithium perchlorate is in excess of about 50 mol-percent of the total of lithium perchlorate and diamine.

5. The method of claim 4 in which said diamine is trimethylene diamine.

6. The method of forming a polymeric solid solution of lithium perchlorate and a polymer in the same homogeneous phase which comprises dissolving an oxidant amount of lithium perchlorate in an amino alcohol and polymerizing the said alcohol with a diisocyanate.

7. The method of claim 1 wherein said diisocyanate is in the form of a urethane of a polyisocyanate with a lower aliphatic monohydric alcohol.

8. The method of claim 3 wherein said diamine is in the form of an acid addition salt of the diamine.

9. A composition of matter comprising a polymeric solid solution of an oxidant amount of lithium perchlorate and polymer in the same homogeneous phase wherein said polymer is characterized by the fact that at least about half of the bonds linking recurrent repetitive units are urea groups, and the remainder of said bonds are selected from the class consisting of urea groups and urethane groups.

10. The product of claim 9 wherein said remainder of said bonds are urethane groups.

11. The product of claim 9 wherein said remainder of said bonds are urea groups.

References Cited

UNITED STATES PATENTS

| | | | |
|---|---|---|---|
| 3,054,702 | 9/1962 | Stengel et al. | 149—19 |
| 3,055,781 | 9/1962 | Yamamoto | 149—83 XR |
| 3,002,830 | 10/1961 | Barr | 149—83 XR |
| 3,000,713 | 9/1961 | Gold | 149—19 |
| 3,050,423 | 8/1962 | Hudson | 149—19 |

BENJAMIN R. PADGETT, Primary Examiner

U.S. Cl. X.R.

149—19, 20, 22, 44